United States Patent
Cazanas et al.

(10) Patent No.: US 8,774,073 B1
(45) Date of Patent: Jul. 8, 2014

(54) ISSUANCE OF SLEEP COMMANDS TO MOBILE COMMUNICATION DEVICES FROM RADIO NETWORK CONTROLLER

(75) Inventors: Carlos A Cazanas, Bethlehem, PA (US); Azam Khan, Franklin, NJ (US); Akhila Rao, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 906 days.

(21) Appl. No.: 12/717,564

(22) Filed: Mar. 4, 2010

(51) Int. Cl.
*G08C 17/00* (2006.01)
*H04W 4/00* (2009.01)

(52) U.S. Cl.
USPC .......................................... 370/311; 370/328

(58) Field of Classification Search
CPC ..... H04W 12/06; H04W 12/08; H04W 28/16; H04W 76/046; H04L 63/0892; H04L 63/08; H04L 12/5695
USPC .......................................... 370/254, 311, 328
See application file for complete search history.

(56) References Cited

U.S. PATENT DOCUMENTS

| | | | |
|---|---|---|---|
| 6,765,893 B1 | 7/2004 | Bayley | |
| 7,499,732 B2 | 3/2009 | Lee | |
| 2005/0141541 A1* | 6/2005 | Cuny et al. | 370/437 |
| 2005/0233745 A1* | 10/2005 | Noguchi et al. | 455/433 |
| 2006/0105774 A1* | 5/2006 | Ranta-Aho et al. | 455/453 |
| 2007/0259673 A1* | 11/2007 | Willars et al. | 455/453 |
| 2008/0101276 A1* | 5/2008 | Huang et al. | 370/328 |
| 2009/0196230 A1* | 8/2009 | Kim et al. | 370/328 |
| 2009/0232040 A1* | 9/2009 | Abdel-Kader | 370/311 |
| 2010/0281521 A1* | 11/2010 | Sakakihara et al. | 726/3 |
| 2010/0329167 A1* | 12/2010 | Linden et al. | 370/312 |
| 2011/0244867 A1* | 10/2011 | Zhao | 455/438 |
| 2012/0084165 A1* | 4/2012 | Hirose et al. | 705/26.1 |

* cited by examiner

*Primary Examiner* — Ayaz Sheikh
*Assistant Examiner* — Hoang-Chuong Vu

(57) ABSTRACT

A radio network controller may be configured to issue a sleep command to each of a plurality of mobile communication devices commanding the mobile communication devices to stop sending requests for data services to the radio network controller. The sleep commands may be issued based on the performance of the radio network controller, including any authentication, authorization, and accounting server with which it communicates.

A mobile communication device may be configured to receive a sleep command from the radio network controller. The mobile communication device may be configured to stop sending requests for data services to the radio network controller upon receipt of a sleep command.

22 Claims, 2 Drawing Sheets

ISSUANCE OF SLEEP COMMANDS TO MOBILE COMMUNICATION DEVICES FROM RADIO NETWORK CONTROLLER

BACKGROUND

1. Technical Field

This disclosure relates to wireless communication devices, such as cell phones, laptops, and PDAs, and to radio network controllers which allow these wireless devices communicate to obtain data services.

2. Description of Related Art

Wireless communication devices, such as cell phones, laptops, and PDAs, may communicate with one or more data networks for the purpose of transmitting and/or receiving data. The data may include one or more web pages, images, streaming media, games, ring tones, and/or other information.

To facilitate and to regulate these communications, a mobile communication device may send a request to a radio network controller (RNC) for a data service relating to the data network. In turn, the radio network controller may communicate with an authentication, authorization, and accounting (AAA) server to authenticate the mobile communication device and/or to verify its authorization to access the data network. Once approved, the radio network controller may serve as a gateway between the mobile communication device and the data network.

The radio network controller may experience delays when performing these tasks. These may be caused, for example, by the near simultaneous receipt of requests for data services from a large number of mobile communication devices. Delays may in addition or instead be caused by delays in responses from the authentication, authorization, and accounting server, which may similarly be caused by the server receiving a large number of requests from radio network controllers.

When a mobile communication device fails to receive a timely response to a request to the radio network controller for data services, the mobile communication device may resend the request. If the resent request does not receive a timely response, the request may again be resent, and so forth. This may cause the radio network controller to queue multiple requests for the very same service, which may substantially add to the load on the controller.

Similarly, when a radio network controller does not receive a timely response to a request which it delivers to an authentication, authorization, and accounting server, the radio network controller may resend the request to the server. If the resent request does not receive a timely response, the request may again be resent, and so forth. This may cause the server to queue multiple requests for the very same service, which may substantially add to the load on the server.

The continued resending of requests by mobile communication devices may therefore cause a cascading delay, which may ultimately lead to a denial of service. This may occur even though the problem which originally caused the delay, such as a delay in receiving responses from an authentication, authorization, and accounting server, has been remedied.

To help alleviate this problem, mobile communication devices have been programmed to stop sending requests for data services to radio network controllers after a predetermined number of tries have failed to be successful. However, the period of self-imposed delay may be more than what is needed to allow for a recovery, causing an unnecessarily long delay in obtaining access to desired data. In other cases, the period of self-imposed delay may not be sufficient to enable the radio network controller and/or its associated, authentication, authorization, and accounting server to recuperate, in which case the resent requests may continue to contribute to an overload.

SUMMARY

A radio network controller may include a mobile communication device controller configured to control communications between a plurality of mobile communication devices and one or more data networks. A sleep command issuance subsystem may be configured to issue a sleep command to each of the plurality of mobile communication devices commanding the mobile communication devices to stop sending requests for data services to the radio network controller.

A sleep determination subsystem may be configured to determine when the sleep commands should be issued by the sleep command issuance subsystem based on the performance of the mobile communication device controller.

The performance of the mobile communication device controller on which the issuance of the sleep commands may be based may includes the volume of authentication transactions being handled by the radio network controller. The sleep determination subsystem may be configured to determine that the sleep commands should be issued by the sleep command issuance subsystem when the volume of authentication transactions being handled by the radio network controller exceeds a threshold. The threshold may be a percentage increase in the volume of authentication transactions being handled by the radio network controller.

The performance of the mobile communication device controller may include the length of delay in responses to requests for authentication. The sleep determination subsystem may be configured to determine that the sleep commands should be issued by the sleep command issuance subsystem when the length of delay in responses to requests for authentication exceeds a threshold. The threshold may be a percentage increase in the length of delay in responses to requests for authentication.

Each sleep command may include information indicative of the length of time the mobile communication device to which the sleep command is issued should stop sending requests for data services to the radio network controller. The length of time indicated by each of the sleep commands may be the same, such as within the range of 30-60 seconds.

Each sleep command may include information indicative of a message which is to be communicated to a user of the mobile communication device to which the sleep command is issued alerting the user to a communication delay.

The sleep command issuance subsystem may be configured to issue the sleep commands in response to an instruction from a user to issue the sleep commands.

A mobile communication device may include a mobile communication subsystem configured to communicate requests for data services to a radio network controller, each of which requests access to one or more data networks. A sleep command receiving subsystem may be configured to receive a sleep command from the radio network controller. A sleep command implementation subsystem may be configured to cause the mobile communication subsystem to stop sending requests for data services to the radio network controller upon receipt of a sleep request by the sleep command receiving subsystem.

The sleep command receiving system may be configured to receive information from the radio network controller indicative of a length of time the mobile communication device should stop sending requests for data services to the radio network controller. The sleep command implementation subsystem may be configured to cause the mobile communication subsystem to stop sending requests for data services to the radio network controller for at least this length of time.

The sleep command implementation subsystem may be configured to automatically cause the mobile communication subsystem to start resending requests for data services to the radio network controller following expiration of this length of time.

The sleep command implementation subsystem may be configured to cause the mobile communication subsystem to stop sending requests for data services to the radio network controller for at least a period of time that was stored in the mobile communication device prior to receipt of the sleep command.

The mobile communication subsystem may be configured to automatically resend a request for data services to the radio network controller if the mobile communication subsystem does not receive a timely response from the radio network controller to an earlier request for data services which the mobile communication subsystem sent to the radio access controller. The sleep command implementation subsystem may be configured to cause the mobile communication subsystem to stop automatically resending requests for data services to the radio network controller upon receipt of a sleep request by the sleep command receiving subsystem.

The mobile communication subsystem may be configured to send a request for data services to the radio network controller each time the mobile communication subsystem receives a user request for access to a data network. The sleep command implementation subsystem may be configured to cause the mobile communication subsystem to stop sending the requests for data services requested by the user to the radio network controller upon receipt of the sleep request.

The sleep command receiving subsystem may be configured to receive information from the radio network controller indicative of the length of time the mobile communication device should stop sending the requests for data services. The sleep command implementation subsystem may be configured to cause the mobile communication subsystem to stop sending the requests for data services to the radio network controller for at least this length of time.

The sleep command implementation subsystem may be configured to cause a message to be delivered to a user of the mobile communication device that alerts the user of a communication delay upon receipt of the sleep command. The sleep command receiving subsystem may be configured to receive information from the radio network controller indicative of the message.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
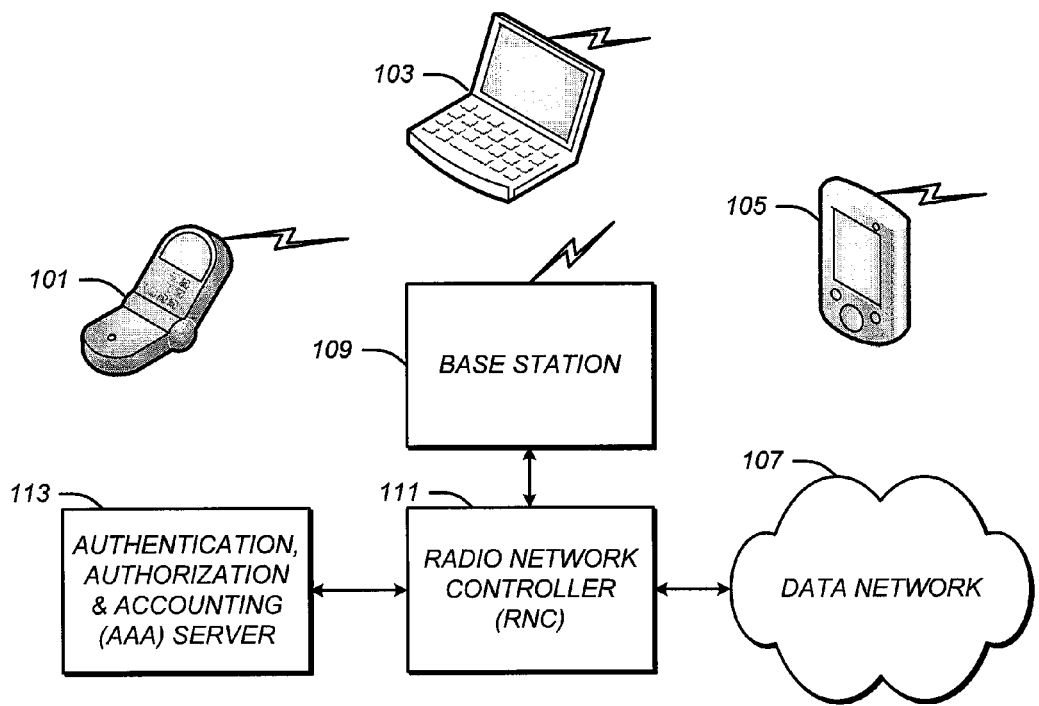
FIG. 1 illustrates portions of a network communication system configured to communicate data to and from mobile communication devices.

FIG. 1 illustrates portions of a network communication system configured to communicate data to and from mobile communication devices.

As illustrated in FIG. 1, the network communication system may include one or more mobile communication devices, such as a cell phone 101, a laptop 103, and a PDA 105. Each of these mobile communication devices may be configured to wirelessly communicate with one or more data networks, such as a data network 107. The communication may seek to obtain data from the data network, such as web pages, images, streaming media, ringtones, and/or games.

The data network 107 may be of any type. For example, the data network 107 may include or consist of the internet, a local area network, a wide area network, or a combination of these. The data network 107 may include one or more servers or other devices configured to provide data to the mobile communication devices, such as web pages, images, streaming media, ringtones, and/or games.

The network communication system may include one or more base stations, such as a base station 109. The base station 109 may be configured to wirelessly communicate with the mobile communication devices, such as with the cell phone 101, the laptop 103, and/or the PDA 105.

When a wireless communication device wishes to obtain or provide data to a data network, it may send a request to access the data network to a radio network controller (RNC), such as a radio network controller 111. In turn, the radio network controller may seek to authenticate the mobile communication device and to verify it is authorized to communicate with the data network. To facilitate this authentication and authorization, the radio network controller may communicate with an authentication, authorization, and accounting (AAA) server, such as an authentication, authorization, and accounting server 113. The authentication, authorization, and accounting server 113 may be configured to respond to the request from the radio network controller with information indicating whether the mobile communication device is authentic and/or authorized to access the data network.

One or more of the communications to or from one of the mobile communication devices may be processed by one or more additional subsystems not illustrated in FIG. 1.

Figure 2:
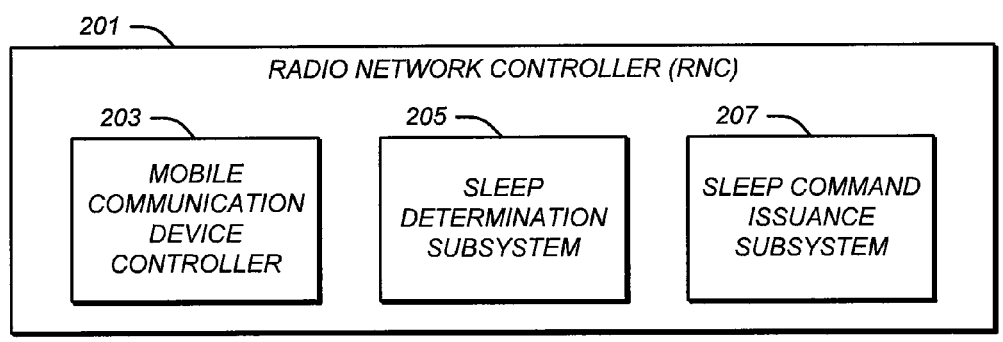
FIG. 2 illustrates a radio network controller configured to issue sleep commands to mobile communication devices.

FIG. 2 illustrates a radio network controller 201 configured to issue sleep commands to mobile communication devices. The radio network controller 201 may function as the radio network controller 111 illustrated in FIG. 1 or in connection with any other type of network communication system. Similarly, the radio network controller 111 illustrated in FIG. 1 may be different than the radio network controller 201 illustrated in FIG. 2.

The radio network controller 201 may include a mobile communication device controller 203, a sleep determination subsystem 205, and a sleep command issuance subsystem 207.

The mobile communication device controller 203 may be configured to control communications between a plurality of mobile communication devices, such as the cell phone 101, the laptop 103, and/or the PDA 105 illustrated in FIG. 1, and one or more data networks, such as the data network 107 illustrated in FIG. 1. The mobile communication device controller 203 may contain the types of components and be configured to provide the types of services traditionally provided by radio network controllers, such as control of base stations, such as the base station 109 illustrated in FIG. 1, radio resource management, certain mobility management functions, and a point where encryption may done before user data is sent to and/or received from the mobile communication devices. The mobile communication device controller 203 may also function as a gateway between the mobile communication devices and the data network, such as the data network 107 illustrated in FIG. 1.

The sleep command issuance subsystem 207 may be configured to issue a sleep command to each of the mobile communication devices which send requests for data services to the radio network controller 201. Each sleep command may command the mobile communication device to which it is issued to stop sending requests for data services to the radio network controller 201.

The sleep determination subsystem 205 may be configured to determine when the sleep commands should be issued by the sleep command issuance subsystem 207. The sleep determination subsystem 205 may make this determination based on the performance of the radio network controller 201. The performance of the radio network controller 201 may be governed by the performance of any authentication, authorization, and accounting server with which the radio network controller 201 communicates. The assessed performance of the radio network controller thus includes any delays caused by the authentication, authorization, and accounting server with which it communicates.

The performance of the mobile communication device controller 203 on which the issuance of the sleep commands is based may include the volume of the authentication transactions being handled by the radio network controller in response to requests for data services made by the mobile communication devices which are communicating with the radio network controller 201. The sleep determination subsystem 205 may be configured to determine that the sleep commands may be issued by the sleep command issuance subsystem 207 when the volume of authentication transactions being handled by the radio network controller 201 exceeds a threshold. That threshold may be a percentage increase in the volume of authentication transactions being handled by the radio network controller 201. For example, when the volume of authentication transactions being handled by the radio network controller 201 increases by more than 20%, the sleep determination subsystem 205 may be configured to determine that the sleep command should be issued by the sleep command issuance subsystem 207. The threshold may instead be a fixed volume.

The performance of the mobile communication device controller 203 may in addition or instead include the length of delay in responses to requests for authentication which the radio network controller 201 makes to the authentication, authorization, and accounting server. The sleep determination subsystem 205 may be configured to determine that the sleep commands should be issued by the sleep command issuance subsystem 207 when the length of delay in the responses to requests for authentication exceed a threshold. The threshold may be a percentage increase in the length of delay in the responses to requests for authentication. For example, the sleep determination subsystem 205 may be configured to determine that the sleep commands may be issued by the sleep command issuance subsystem 207 when the length of delay in the responses for authentication have increased by 20%. The threshold may instead be a fixed amount of delay.

Any other types of parameters may be considered and/or any other types of algorithms may be implemented by the sleep determination subsystem 205 when determining when the sleep commands should be issued by the sleep command issuance subsystem 207. For example, the sleep determination subsystem 205 may be configured to determine that the sleep commands should be issued by the sleep command issuance subsystem 207 in response to a manual request for the issuance of the sleep commands by a user or other controller of the radio network controller 201.

The sleep command issuance subsystem 207 may be configured to issue a sleep command to each of the plurality of mobile communication devices commanding the mobile communication devices to stop sending requests for data services to the radio network controller 201. The sleep commands may each include information indicative of the length of time the mobile communication device to which the sleep command is issued should stop sending requests for data services to the radio network controller 201. The length of time indicated by each of the sleep commands may be the same, such as within the range of 30-60 seconds.

Each sleep command may include information indicative of a message which is to be communicated to a user of the mobile communication device to which the sleep command is issued. The message may alert the user to the communication delay.

The sleep command issuance subsystem 207 may be configured to issue the sleep commands in response to an instruction from a user to issue the sleep commands.

Figure 3:
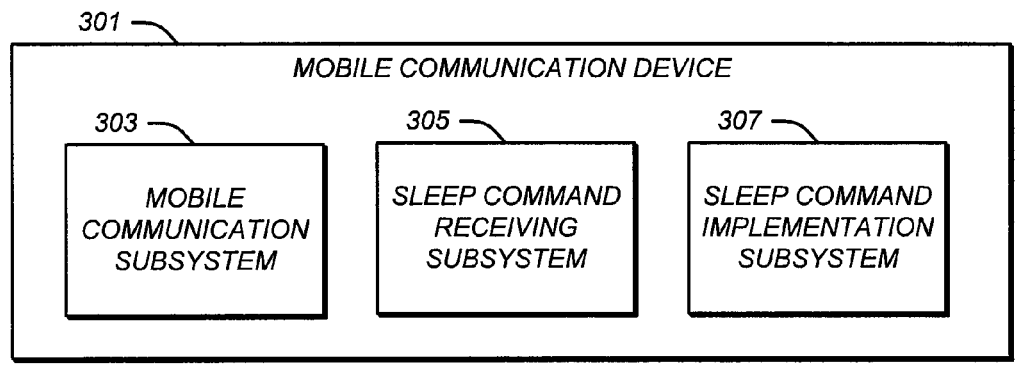
FIG. 3 illustrates a mobile communication device configured to stop sending requests for data services in response to receipt of a sleep command from a radio network controller.

FIG. 3 illustrates a mobile communication device 301 configured to stop sending requests for data services in response to receipt of a sleep command from a radio network controller. The mobile communication device 301 may be used as or included within the cell phone 101, the laptop 103, and/or the PDA 105 illustrated in FIG. 1 or in connection with any other type of network communication system. Similarly, the mobile communication devices illustrated in FIG. 1 may be different than the mobile communication device 301.

The mobile communication device 301 may include a mobile communication subsystem 303, a sleep command receiving subsystem 305, and a sleep command implementation subsystem 307.

The mobile communication subsystem 303 may be configured to communicate requests for data services to a radio network controller, such as to the radio network controller 111 illustrated n FIG. 1. Each request for data services may seek access to one or more data networks, such as to the data network 107 illustrated n FIG. 1.

The sleep command receiving subsystem 305 may be configured to receive a sleep command from a radio network controller, such as from the radio network controller 111.

The sleep command implementation subsystem 307 may be configured to cause the mobile communication subsystem 303 to stop sending requests for data services to the radio network controller upon receipt of a sleep request by the sleep command receiving subsystem 305.

The sleep command receiving subsystem 305 may be configured to receive information from the radio network controller indicative of the length of time the mobile communication device 301 should stop sending requests for data services to the radio network controller. The sleep command implementation subsystem 307 may be configured to cause the mobile communication subsystem 303 to stop sending requests for data services to the radio network controller for at least this length of time. The sleep command implementation subsystem 307 may be configured to automatically cause the mobile communication subsystem 303 to start sending requests for data services to the radio network controller following expiration of this length of time.

In response to the receipt of a sleep command, the sleep command implementation subsystem 307 may in addition or instead be configured to cause the mobile communication subsystem 303 to stop sending requests for data services to the radio network controller for at least a period of time that was stored in the mobile communication device prior to the receipt of the sleep command.

In this case, the duration of the cessation may be governed by data that is internal to the mobile communication device 301, not by information received from the radio network controller. In other words, the sleep command implementation subsystem 307 may be configured to internally dictate the sleeping period following receipt of a sleep command, rather than to obtain this information from the sleep command. The sleep command implementation subsystem 307 may include one or more data storage devices configured to store information indicative of this period of time.

The mobile communication subsystem 303 may be configured to automatically resend a request for data services to the radio network controller if the mobile communication subsystem does not receive a timely response from the radio network controller to an earlier request for data services which the mobile communication subsystem 303 sent to the radio access controller, and to continue automatically resending requests for data services until a timely response is received. The sleep command implementation subsystem 307 may be configured to cause the mobile communication subsystem to stop automatically re-sending requests for data services to the radio network controller upon receipt of a sleep request by the sleep command receiving subsystem 305.

The mobile communication subsystem 303 may be configured to send a request for data services to the radio network controller each time the mobile communication subsystem receives a user request for access to a data network. The sleep command implementation subsystem 307 may be configured to cause the mobile communication subsystem 303 to stop sending the request for data services requested by the user to the radio network controller upon receipt of the sleep request.

In other words, the sleep command implementation subsystem 307 may be configured to block both manual requests for data services that may be initiated by a user, automated requests for data services that may be automatically initiated if successful responses to earlier requests for data services are not timely received, or both.

The sleep command receiving subsystem 305 may be configured to receive information from the radio network controller indicative of the length of time the mobile communication device 301 should stop sending requests for data services. The sleep command implementation subsystem 307 may be configured to cause the mobile communication subsystem 303 to stop sending requests for data services to the radio network controller for at least this length of time.

The sleep command implementation subsystem 307 may be configured to cause a message to be delivered to a user of the mobile communication device upon receipt of the sleep command that alerts a user of a communication delay. The sleep command receiving system subsystem 307 may be configured to receive information from the radio network controller indicative of this message. In this instance, the sleep command implementation subsystem 307 may be configured to cause this received message to be delivered to the user.

Figure 4:
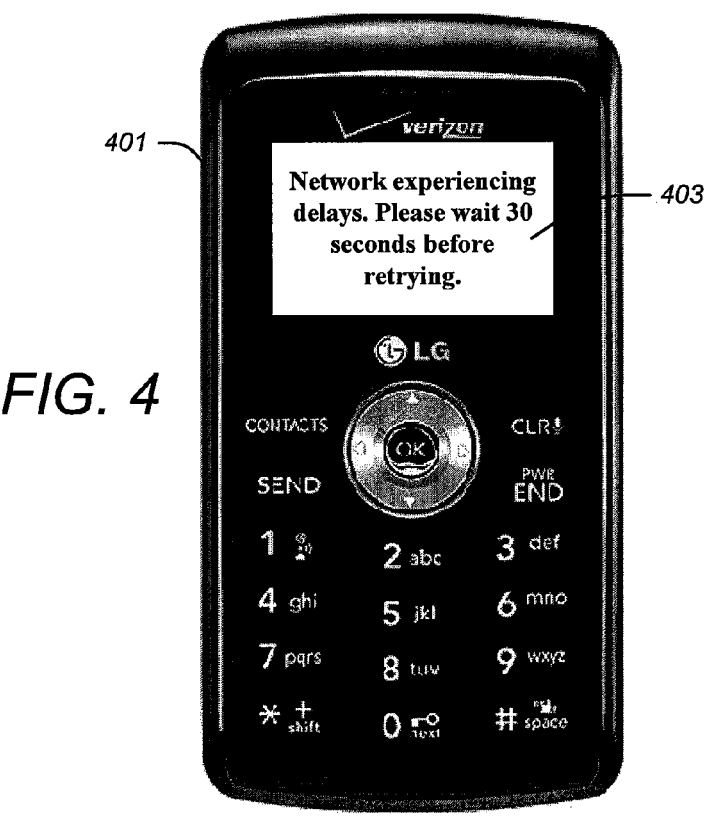
FIG. 4 illustrates a mobile communication device displaying a message alerting a user to a communication delay.

FIG. 4 illustrates a mobile communication device 401 displaying a message 403 alerting a user to a communication delay. The mobile communication device 401 may include the components of the mobile communication device 301 illustrated in FIG. 3 or may include different components. Similarly, the mobile communication device 301 may be different than the mobile communication device 401 illustrated in FIG. 4.

The message 403 may contain any content and be communicated in any way. For example, the message 403 may express the concept that a network delay is being experienced. It may in addition or instead express the concept that the user should wait for a stated time period before again requesting access to a data network, such as the period of time communicated along with a sleep command or stored within the mobile communication device 401 before receipt of the sleep command. As illustrated in FIG. 4, this message may be visually displayed. It may in addition or instead be communicated by a sound transducer and/or by any other means.

The following systems and subsystems have now been described: the base station 109, the radio network controller 111, the authentication, authorization and accounting server 113, the data network 107, the radio network controller 201, the mobile communication device controller 203, the sleep determination subsystem 205, the sleep command issuance subsystem 207, the mobile communication device 301, the mobile communication subsystem 303, the sleep command receiving subsystem 305, and the sleep command implementation subsystem 307. Each includes computer hardware, and, optionally, computer software. The computer hardware includes one or more hardware processors, such as one or more microprocessors, and hardware memory devices, such as one or more RAMS. The computer hardware may include appropriate interface devices. When present, the computer software may include one or more operating systems, application programs, and communication programs. The computer hardware and, when present, computer software may be configured to implement each of the functions of these systems and subsystems which have, respectively, been described above. When present, the computer software may include one or more algorithms configured to cause these functions to be performed in connection with the associated computer hardware. Each of these systems and subsystems may be configured to perform additional functions and/or different functions.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, instead of or in addition to the RNC, alternative components in the authentication architecture may be configured to transmit sleep messages to the handsets. Some of these elements may include the PDSN (Packet Data Serving Node) or the AAA itself. Additionally, handsets may be delivered with pre-configured algorithms which they may use for making decisions on whether to try or to sleep.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. A radio network controller comprising:
    a mobile communication device controller configured to control communications between a plurality of mobile communication devices and one or more data networks;
    a sleep command issuance subsystem configured to issue a sleep command to each of the plurality of mobile communication devices commanding the mobile communication devices to stop sending requests for data services to the radio network controller; and
    a sleep determination subsystem configured to determine when the sleep commands should be issued by the sleep command issuance subsystem based on the performance of the mobile communication device controller, wherein the performance of the mobile communication device controller on which the issuance of the sleep commands is based includes a volume of authentication transactions being handled by the radio network controller.

2. The radio network controller of claim 1 wherein the sleep determination subsystem is configured to determine that the sleep commands should be issued by the sleep command issuance subsystem when the volume of authentication transactions being handled by the radio network controller exceeds a threshold.

3. The radio network controller of claim 2 wherein the threshold is a percentage increase in the volume of authentication transactions being handled by the radio network controller.

4. The radio network controller of claim 1 wherein the performance of the mobile communication device controller includes the length of delay in responses to requests for authentication.

5. The radio network controller of claim 4 wherein the sleep determination subsystem is configured to determine that the sleep commands should be issued by the sleep command issuance subsystem when the length of delay in responses to requests for authentication exceeds a threshold.

6. The radio network controller of claim 5 wherein the threshold is a percentage increase in the length of delay in responses to requests for authentication.

7. The radio network controller of claim 1 wherein the sleep commands each include information indicative of the length of time the mobile communication device to which the sleep command is issued should stop sending requests for data services to the radio network controller.

8. The radio network controller of claim 7 wherein the length of time indicated by the information in each of the sleep commands is the same.

9. The radio network controller of claim 8 wherein the length of time is within the range of 30-60 seconds.

10. The radio network controller of claim 1 wherein each sleep command includes information indicative of a message which is to be communicated to a user of the mobile communication device to which the sleep command is issued alerting the user to a communication delay.

11. The radio network controller of claim 1 wherein the sleep command issuance subsystem is configured to issue the sleep commands in response to an instruction from a user to issue the sleep commands.

12. A mobile communication device comprising:
    a mobile communication subsystem configured to communicate requests for data services to a radio network controller, each of which requests access to one or more data networks;
    a sleep command receiving subsystem configured to receive a sleep command from the radio network controller based on the performance of the radio network controller, wherein the performance of the radio network controller on which the issuance of the sleep command is based includes a volume of authentication transactions being handled by the radio network controller; and
    a sleep command implementation subsystem configured to cause the mobile communication subsystem to stop sending requests for data services to the radio network controller upon receipt of a sleep request by the sleep command receiving subsystem, wherein the sleep command implementation subsystem is configured to cause the mobile communication subsystem to stop sending requests for data services to the radio network controller for at least a period of time that was stored in the mobile communication device prior to receipt of the sleep command.

13. The mobile communication device of claim 12 wherein:
    the mobile communication subsystem is configured to automatically resend a request for data services to the radio network controller if the mobile communication subsystem does not receive a timely response from the radio network controller to an earlier request for data services which the mobile communication subsystem sent to the radio access controller; and
    the sleep command implementation subsystem is configured to cause the mobile communication subsystem to stop automatically resending requests for data services to the radio network controller upon receipt of a sleep request by the sleep command receiving subsystem.

14. The mobile communication device of claim 12 wherein:
    the mobile communication subsystem is configured to send a request for data services to the radio network controller each time the mobile communication subsystem receives a user request for access to a data network; and the sleep command implementation subsystem is configured to cause the mobile communication subsystem to stop sending the requests for data services requested by the user to the radio network controller upon receipt of the sleep request.

15. The mobile communication device of claim 14 wherein:

the mobile communication subsystem is configured to automatically resend a request for data services to the radio network controller if the mobile communication subsystem does not receive a timely response from the radio network controller to an earlier request for data services which the mobile communication subsystem sent to the radio access controller; and the sleep command implementation subsystem is configured to cause the mobile communication subsystem to stop automatically resending requests for data services to the radio network controller upon receipt of a sleep request by the sleep command receiving subsystem.

16. The mobile communication device of claim 12 wherein:

the sleep command receiving subsystem is configured to receive information from the radio network controller indicative of the length of time the mobile communication device should stop sending the requests for data services; and the sleep command implementation subsystem is configured to cause the mobile communication subsystem to stop sending the requests for data services to the radio network controller for at least the length of time.

17. The mobile communication device of claim 12 wherein the sleep command implementation subsystem is configured to cause a message to be delivered to a user of the mobile communication device that alerts the user of a communication delay upon receipt of the sleep command.

18. The mobile communication device of claim 17 wherein the sleep command receiving subsystem is configured to receive information from the radio network controller indicative of the message.

19. The mobile communication device of claim 17 wherein the sleep command implementation subsystem is configured to cause the message to be displayed to the user upon receipt of the sleep command, the message indicating that a network delay is being experienced.

20. The mobile communication device of claim 19 wherein the message provides a wait period before the user should request access to a data network.

21. The mobile communication device of claim 12 wherein the sleep command implementation subsystem is configured to cause the mobile communication subsystem upon receipt of the sleep request to stop sending both manual requests for data services that are initiated by a user and automated requests for data services that are automatically initiated when successful responses to earlier requests for data services are not timely received.

22. The mobile communication device of claim 12 wherein the sleep command implementation subsystem is configured to cause the mobile communication subsystem upon receipt of the sleep request to stop sending either manual requests for data services that are initiated by a user or automated requests for data services that are automatically initiated when successful responses to earlier requests for data services are not timely received, but not both.

\* \* \* \* \*